United States Patent [19]

Killinger

[11] 4,290,045
[45] Sep. 15, 1981

[54] BRAKE SYSTEM WARNING CIRCUIT
[75] Inventor: Marvin H. Killinger, South Bend, Ind.
[73] Assignee: The Bendix Corporation, Southfield, Mich.
[21] Appl. No.: 83,443
[22] Filed: Oct. 10, 1979
[51] Int. Cl.³ .............................................. B60T 17/22
[52] U.S. Cl. ..................................... 340/52 C; 303/20; 188/1.11
[58] Field of Search ............. 340/52 C, 52 B; 303/20, 303/80, 85; 188/1 A

[56] References Cited
U.S. PATENT DOCUMENTS

| | | | |
|---|---|---|---|
| 3,506,958 | 4/1970 | Kawabe | 340/52 C |
| 3,667,497 | 6/1972 | Farmery | 340/52 C |
| 4,025,781 | 5/1977 | Brearley | 188/1 A |

Primary Examiner—Alvin H. Waring
Attorney, Agent, or Firm—Ken C. Decker; William A. Marvin

[57] ABSTRACT

A warning circuit which generates signals in response to selected conditions of a vehicle hydraulic brake system. The brake system includes an engine-driven main source of hydraulic pressure, a relay-actuated auxiliary source of hydraulic pressure, a flow sensor for sensing the operation of the main source and a brake switch for coupling the auxiliary source with the battery in response to an operator brake application. The warning circuit includes a first transistor switch coupled with a warning lamp, with the ignition switch and with the auxiliary source. A second transistor switch is coupled to the ignition switch, to the auxiliary relay, to the flow sensor and to the first transistor switch. A third transistor switch is coupled to the ignition swtich, to the flow sensor and to the first transistor switch. The system actuates the auxiliary source upon failure of the main source during an operator brake application. The warning circuit generates a warning signal when the ignition switch is on during failure of the primary source independent of the application of the brakes and independent of the existence of an open circuit condition in the auxillary source. A warning signal is also generated in response to electrical open circuit conditions indicating failures of the various sensing components of the brake system.

21 Claims, 1 Drawing Figure

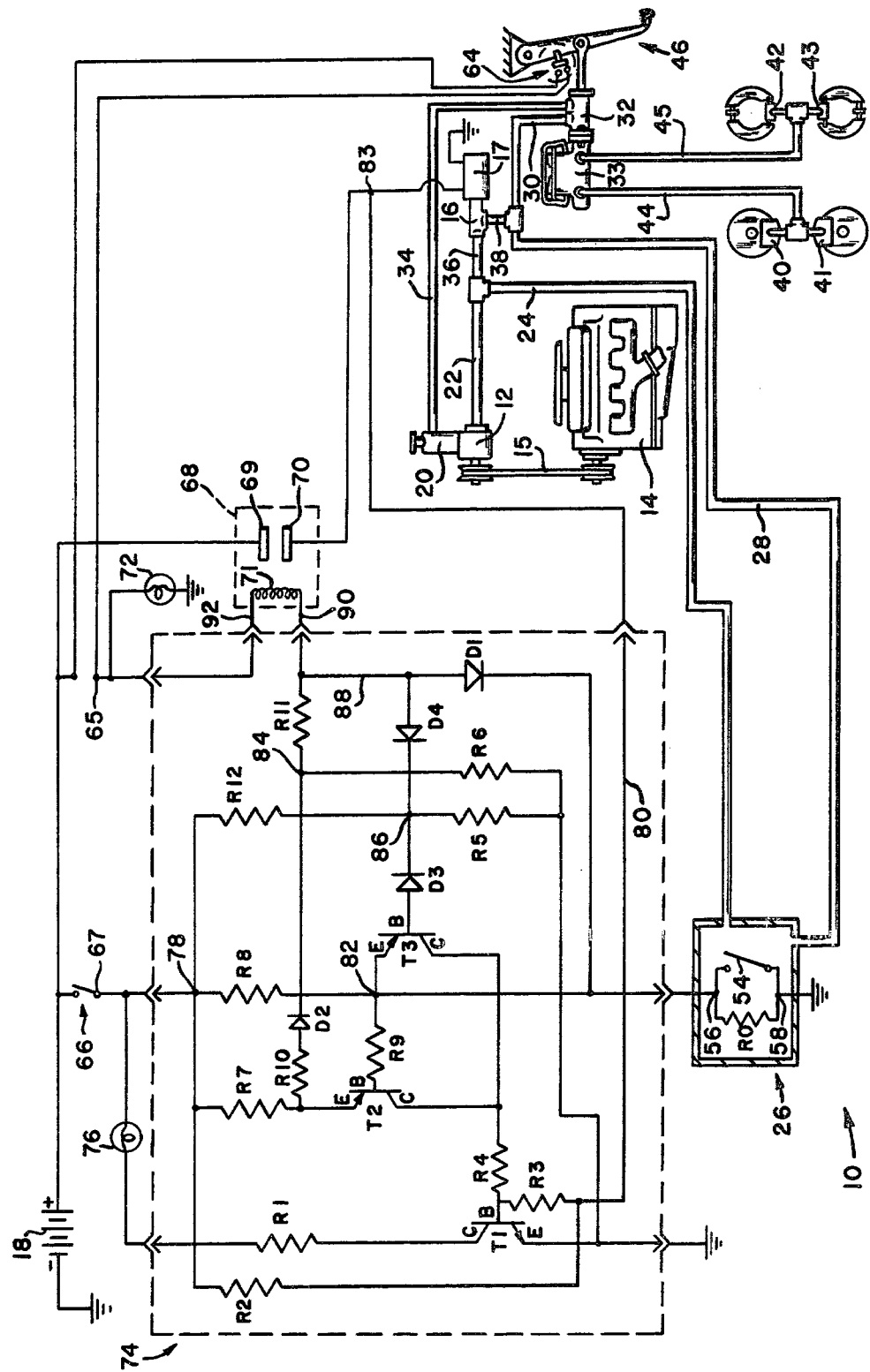

BRAKE SYSTEM WARNING CIRCUIT

BACKGROUND OF THE INVENTION

This invention pertains generally to a circuit arrangement for actuating a warning device in response to predetermined conditions of a vehicle brake system.

In vehicles equipped with hydraulically actuated power brake boosters, an engine-driven or main source of hydraulic pressure, such as a power steering pump, may be utilized in combination with a back-up source of hydraulic pressure, such as a second pump driven by an electric motor powered off the vehicle battery. This type of braking system is disclosed in co-pending application Ser. Nos. 83,440 and 83,441, which are commonly assigned with the present application.

When the vehicle and brake system are operating normally, the power steering pump operates when the vehicle engine is operating. Therefore, an abnormal condition exists when the ignition switch is "on", but the main power steering pump is not operating.

The system illustrates an electronic brake system warning circuit generates a warning signal in response to various conditions of such a brake system. However, this warning circuit does not generate a warning signal in response to the above-mentioned abnormal condition, unless simultaneously with this condition, there also occurs either (1) an operator brake application, or (2) an open circuit condition in the auxiliary pump motor.

SUMMARY OF THE INVENTION

The object of the present invention is to provide improved circuitry which controls the operation of a vehicle brake system and generates warning signals under selected conditions.

An advantage of the present invention is that it provides circuitry which generates warning signals in response to selected conditions of the brake system, and in particular, in response to the above-mentioned abnormal brake system condition independent of other conditions of the brake system.

Another advantage of the present invention is that it provides a test of the brake system during vehicle start-up and it provides warning signals for electrical open circuit conditions in various components of the brake system.

These advantages are achieved by the present invention comprising a warning circuit which actuates a warning device in response to selected conditions of a vehicle hydraulic brake system. The hydraulic brake system includes an engine-driven main source of hydraulic brake pressure, a relay-actuated source of auxiliary hydraulic brake pressure, a sensor for sensing the operation of the main source and a brake switch which connects the relay and the warning circuit with the battery in response to an operator brake application. The warning circuit includes three transistor switches coupled with a plurality of resistors and semiconductor diodes. The warning circuit is coupled to a warning lamp, to the vehicle ignition switch, to a vehicle ground potential, to the auxiliary source, to the relay, to the sensor and to the brake switch.

The warning circuit and the brake system cooperate to actuate a pump of the auxiliary source upon failure of the main source during an operator brake application. A warning signal is generated upon failure of the main source when the ignition switch is on, even in the absence of a brake application or even in the absence of an open circuit condition in the auxiliary source motor.

The warning signal is also generated in response to the lack of electrical continuity in various components of the brake system. Preferably, open circuit conditions of the auxiliary pump, relay coil, or the main source sensor generate warning signals.

BRIEF DESCRIPTION OF THE DRAWING

The FIGURE is a schematic diagram of a vehicle brake system coupled with applicant's warning circuit.

DETAILED DESCRIPTION

A vehicle brake system 10 includes a main hydraulic power steering fluid pump 12 powered by the engine 14 via belt 15 and an auxiliary or back-up brake fluid pump 16 driven by an electric motor 17 powered by the vehicle battery 18. Main pump 12 pumps hydraulic fluid from reservoir 20 through conduits 22 and 24, fluid flow sensor 26, conduits 28 and 30 to brake booster 32 and back to reservoir 20 through return 34. Back-up pump 16 pumps fluid from reservoir 20 through pump 12, conduits 22, 36, 38, and 30 to brake booster 32 and back to reservoir 20 through return 34. Master cylinder 33 communicates pressurized brake fluid to wheel assemblies 40, 41, 42, and 43 via conduits 44 and 45 in response to vehicle operator brake applications applied via the brake pedal 46.

Fluid flow sensor 26 senses the operation of the power steering pump 12 by sensing fluid flow through conduits 24 and 28. Sensor assembly 26 includes a resistor RO and a switch 54 connected in parallel between a terminal 56 and a grounded terminal 58. Fluid flow sensor 26 operates to close switch 54 when the power steering pump 12 is not operating.

A brake switch 64 is adapted to connect terminal 65 with the positive terminal of battery 18 during a operator brake application. A vehicle ignition switch 66 is adapted to connect terminal 67 with the positive terminal of battery 18 when the vehicle operator turns on the engine 14 and the power steering pump 12. A relay device 68 includes a pair of contacts 69 and 70 which close to connect the electric auxiliary pump motor 17 with the vehicle battery 18 when the relay coil 71 is energized. The vehicle brake lights 72 are connected between terminal 65 and ground.

A warning circuit 74 is connected to the switches 64 and 66, to the relay 68, to the auxiliary pump motor 17, to the sensor assembly 26, to a ground potential and to a warning lamp 76. The warning circuit 74 activates a lamp 76 in response to the conditions of the switch 66 and of the various components of the brake system 10. Warning circuit 74 includes a terminal 78 which is connected to one lead of the lamp 76 and to terminal 67 of switch 66.

A resistor R1 is connected between the other lead of lamp 76 and the collector terminal C of npn transistor T1. A resistor R2 is connected between terminal 78 and resistor R3 which, in turn, is connected to the base terminal B of transistor T1. A common connection 80 connects resistors R2, R3, relay contact 70 and terminal 83 of auxiliary pump motor 17. A resistor R4 is connected between the base B of transistor T1 and the collector terminals C of pnp transistors T2 and T3. The emitter terminal E of transistor T1 is connected to a ground potential and to resistors R5 and R6. A resistor R7 is connected between terminal 78 and the emitter terminal E of transistor T2. A resistor R8 is connected between terminal 78 and terminal 82. Terminal 82 is connected to resistor R8, to the base B of transistor T2 through resistor R9, to the emitter E of transistor T3, to terminal 56 of sensor assembly 26 and to the cathode of diode D1. One end of resistor R10 is connected to resistor R7 and to the emitter E of transistor T2. The other end of resistor R10 is connected to the anode of diode D2.

The cathode of diode D2 is connected to terminal 84, which, in turn, is connected to resistor R6 and to resistor R11. A resistor R12 connects terminal 78 with a terminal 86, which in turn, is connected with the cathodes of diodes D3 and D4 and with a ground potential through resistor R5. The anode of diode D3 is connected to the base B of transistor T3. A common connection 88 connects resistor R11 with the anodes of diodes D1 and D4 and with a terminal 90 of relay coil 71. The other terminal 92 of relay coil 71 is connected to terminal 65 and to a ground potential through brake light 72.

The applicant's brake system warning circuit 74 operates to actuate warning lamp 76 depending upon the status of the ignition switch 66, the brake switch 64, and of the main pump 12 and of the auxiliary pump motor 17.

In particular, with the switch 66 open and without an operator brake application, no power is applied to the circuit 74 so that transistors T1, T2, and T3, are all in a non-conducting state and the lamp 76 remains off. As long as brake switch 64 is open, the relay coil 71 is not energized and the relay contacts 68 and 70 remain separated so that the motor 17 and the auxiliary pump 16 are not energized.

With the switch 66 open and with the brakes applied by the operator depressing brake pedal 46, then brake switch 64 is closed, and the circuit operates as follows: With ignition switch 66 open, then the engine 14 and the main pump 12 cannot operate, and thus there is no fluid flow through flow sensor 26. Sensor 26 operates to close switch 54 in response to the absence of fluid flow through conduits 24 and 28 and flow sensor 26. When the brake switch 64 is closed, current flows to ground through relay coil 71, through forward biased diode D1 and through the closed sensor switch 54. The current through relay coil 71 connects the contact 69 with the contact 70 so that battery voltage is applied to terminal 83 of motor 17 to actuate auxiliary pump 16. Thus, auxiliary pressure is applied whenever the brakes are applied and the main pump is inoperative.

Now, assume that the vehicle brakes have been released, and also assume that the switch 66 is closed, but that the main pump 12 is not operating so that as a result, sensor switch 54 is closed. This situation could occur when the ignition is turned on during vehicle start up, but before the engine 14 begins to operate or when the engine 14 is operating but fan belt 15 is broken. In this case, battery voltage is applied to terminals 67 and 78 and current flows through resistor R8 and the closed sensor switch 54, thus lowering the voltage at the base B of transistor T2, allowing it to turn on. The turned-on or conducting transistor T2 permits a voltage to be applied to the base B of transistor T1 due to the current which flows through resistor R7, transistor T2 and resistor R4. This voltage applied to the base B of transistor T1 turns on transistor T1 so that current may flow from terminal 67 to ground through lamp 76, resistor R1 and conducting transistor T1, thus actuating warning lamp 76. Since the brakes are not applied, the brake switch 64 is open, relay contacts 69 and 70 are separated and the auxiliary pump motor 17 is off. If, however, the brakes are applied, then motor 17 and the auxiliary pump 16 will be turned on by the closing of switch 64 as previously described, and the warning lamp 76 will remain on.

Alternatively assume that the switch 66 is closed and that the engine 14 and the main pump 12 are operating. Also, assume that the brakes are not applied. In this case, the flow of hydraulic fluid from main pump 12 through flow sensor 26 opens sensor switch 54. With sensor switch 54 open, R8 and R0 form a voltage divider which establishes a voltage at the base B of transistor T2 high enough to keep transistor T2 off or non-conducting. Similarly, a voltage divider consisting of R12 and R5 establishes a voltage at the base B of transistor T3 high enough to keep transistor T3 off or non-conducting. With both transistors T2 and T3 non-conducting, no current flows through resistor R4 and the base B of transistor T1 is at a low voltage, and thus transistor T1 is non-conducting so that warning lamp 76 is kept off. Since the brakes are not applied, switch 64 is open and the auxiliary pump motor 17 remains off as previously described. If the brakes are now applied during this situation, then brake switch 64 closes to apply battery voltage to terminal 92 of relay coil 71. However, the current which flows through the relay coil 71 and through diode D1 is limited by resistor R0 to a level which prevents the relay contacts 69 and 70 from closing, thus keeping the auxiliary pump motor 17 off. With diode D1 forward biased and sensor switch 54 open, the voltage at the base of transistor T2 is high enough to keep transistor T2 non-conducting. The voltage at the base B of transistor T1 is kept low enough to keep transistor T1 off by means of the connection of the base B of transistor T1 to ground potential via resistor R3, connection 80, terminal 83 and the motor 17 of auxiliary pump 16. With transistors T1, T2, and T3 off or non-conducting, the warning lamp 76 remains off.

Now assume that the switch 66 is closed and that the engine 14 and the main pump 12 are operating so that switch 54 is open. Also, assume that an open circuit condition exists in the connection of terminal 83 with ground provided by motor 17. With switch 54 open, the current through switch 66 and resistors R8 and R0 is low enough such that the voltage at the base B of transistor T2 is high enough to keep transistor T2 turned off or non-conducting. However, the open circuit condition between terminal 83 and ground reduces the current which flows through resistor R2 from terminal 78 and the open circuit condition eliminates the connection of the base B of transistor T1 with ground via resistor R3, thus raising the voltage at the base B of transistor T1. This increased base voltage turns on transistor T1 so that transistor T1 is conducting, and so that current flows through warning lamp 76 and resistor R1 to actuate the warning lamp 76. The warning lamp 76 is actuated under these conditions regardless of whether the brake switch 64 is closed, and thus regardless of whether the brakes are applied.

Now once again, assume that the switch 66 is closed, and that the engine 14 and the main pump 12 are operating so that sensor switch 54 is open. Also, assume that an open circuit condition occurs in the relay coil 71 which interrupts the connection between terminal 90 and ground through the brake light 72. This open circuit breaks the connection of terminal 84 with ground through resistor R11, relay coil 71 and lamp 72. The loss of this ground connection decreases the current which flows from terminal 78 to ground through resistors R7 and R10 and diode D2, thus raising the voltage at the emitter E of transistor T2 relative to the voltage at the base B of transistor T2. The increased emitter-to-base voltage causes transistor T2 to become conducting. Conducting transistor T2 turns on transistor T1 and actuates warning lamp 76, as previously described.

Finally, assume that while the switch 66 is closed, an electrical open circuit condition in the sensor switch assembly 26 interrupts the connection of terminal 82 with ground 60 through resistor R0. This decreases the current which would otherwise flow from terminal 73 to ground through resistor R8 and raises the voltage at terminal 82 which is connected to the emitter E of transistor T3, thus turning on transistor T3. Current flows from the collector C of conducting transistor T3 to ground through resistors R4 and R3, through terminal 83 and the auxiliary pump motor 17. This current raises the voltage at the base B of transistor T1, turning on transistor T1 and actuating warning lamp 76.

While a preferred embodiment of the invention has been shown, it will be obvious to one skilled in the art that various modifications and changes may be made thereto without departing from the spirit and scope of the invention as hereinafter defined in the claims.

I claim:

1. A warning circuit for a vehicle including an engine, a brake system, and means for actuating the engine, the brake system having a primary source of brake actuation pressure, an auxiliary source of brake actuation pressure, and relay means for actuating the auxiliary source upon failure of the primary source, the warning circuit comprising:
    circuit means coupled to the actuating means and to the relay means for generating a warning signal in response to an open circuit condition of the relay means when the engine is running.

2. The warning circuit of claim 1, wherein the circuit means comprises:
    a controlled switch for coupling with and actuating a warning device and having an input;
    means for coupling the input with the engine actuating means;
    means for coupling the input with a ground potential; and
    means for coupling the input with the ground potential through the relay means, the controlled switch actuating the warning device in response to an open circuit condition in the relay means.

3. The warning circuit of claim 1, wherein the circuit means comprises:
    a controlled switch coupled with a warning device and having an input;
    a first resistance for coupling the input with the engine actuating means;
    a second resistance for coupling the input with a ground potential; and
    a third resistance for coupling the input with the ground potential through the relay means, the controlled switch actuating the warning device in response to an open circuit condition in the relay means.

4. The warning circuit of claim 1, wherein the circuit means comprises:
    a first controlled switch coupled with a warning device and having an input;
    a second controlled switch having an input and being coupled to the input of the first controlled switch;
    first coupling means for coupling the input of the second controlled switch with the engine actuating means;
    second coupling means for coupling the input of the second controlled switch with a ground potential; and
    third coupling means for coupling the input of the second controlled switch with the ground potential through the relay means, the warning circuit responding to an open circuit condition in the third coupling means by increasing the potential at the input of the second controlled switch to actuate the same, the actuated second controlled switch transmitting an output signal to the input of the first controlled switch, the first controlled switch activating the warning device in response to the output signal.

5. The warning circuit of claim 4, wherein:
    the first, second, and third coupling means comprise first, second, and third resistances, respectively.

6. A warning circuit for a vehicle with an ignition switch and with a brake system having primary and auxiliary sources of brake actuation fluid, sensor means for sensing a failure of the primary source, relay means operatively connected to the auxiliary source and to the sensor means for actuating the auxiliary source upon failure of the primary source, the warning circuit comprising:
    circuit means for coupling with the ignition switch through a first connection and for coupling with a ground potential through a second connection comprising the sensor means, the circuit means generating a warning signal in response to an open circuit condition in the second connection when the ignition switch is closed.

7. The warning circuit of claim 6, wherein the circuit means comprises:
    a first controlled switch having output means for coupling with a warning device and having an input;
    a second controlled switch having an input and being coupled to the input of the first controlled switch, the first connection comprising a first resistance for coupling the input of the second controlled switch with the ignition switch, the second connection coupling the input of the second controlled switch with the ground potential, the potential at the input of the second controlled switch increasing in response to an open circuit condition in the second connection to thereby actuate the second controlled switch when the ignition switch is closed, the actuated second controlled switch transmitting an output signal to the input of the first controlled switch, the first controlled switch activating the warning device in response to the output signal.

8. A warning circuit for a vehicle with an engine and a brake system, the vehicle having switch means for starting the engine, the brake system having primary and auxiliary sources of brake actuation fluid pressure, sensor means for sensing the operation of the primary source, a brake switch operable in response to an operator brake application and relay means operatively connected to the brake switch, to the sensor means and to the auxiliary source for actuating the auxiliary source upon failure of the main source during an operator brake application, the warning circuit comprising:

a first controlled switch having input means for coupling with the switch means, with the sensor means, and with the relay means, and having an output; and a second controlled switch having input means for coupling with the output of the first controlled switch, with the auxiliary source and with the switch means, and having output means for coupling with a warning device, the controlled switches cooperating to actuate the warning device in response to selected states of the switch means and of the brake system.

9. The warning circuit of claim 8, further comprising:
a third controlled switch having input means for coupling with the switch means and for coupling with a ground potential through the sensor means, and having an output coupled to the input means of the second controlled switch.

10. The warning circuit of claim 8, further comprising:
a resistance for coupling the input means of the first controlled switch with the switch means; and
means for coupling the input means of the first switch with a ground potential through the sensor means.

11. The warning circuit of claim 8, wherein:
the sensor means comprises an interruptible connection between a pair of terminals, one of which is connected to the ground potential, the sensor means also comprising control means operatively connected to the interruptible connection and to the primary source, the control means operating to interrupt the interruptible connection in response to operation of the primary source.

12. The warning circuit of claim 8, wherein:
a first resistance couples the switch means with a ground potential through the auxiliary source; and
a second resistance couples the second controlled switch with the first resistance and with the ground potential through the auxiliary source.

13. A warning circuit for a vehicle with an engine and a brake system, the warning circuit actuating a warning device in response to conditions of the brake system, the vehicle having an ignition switch for actuating the engine, the brake system having primary and auxiliary sources of brake actuation fluid pressure and sensor means for sensing the operation of the primary source, the warning circuit comprising:
a first controlled switch;
means for coupling the first controlled switch with the ignition switch;
means for coupling the first controlled switch with a ground potential via a connection through the sensor means;
a second controlled switch;
means for coupling the second controlled switch with the first controlled switch; and
means for coupling the second controlled switch with the warning device, the controlled switches cooperating to actuate the warning device in response to an open circuit condition in the connection when the ignition switch is closed.

14. The warning circuit of 13, wherein:
a first resistance couples the ignition switch with the connection; and
a second resistance couples the second controlled switch with the first resistance and with the connection.

15. A warning circuit for a vehicle including an engine, a pressure actuated brake system, and means for actuating the engine; said brake system having a primary source of brake actuated pressure, an auxiliary source of brake actuation pressure, a pressure sensor for detecting a failure of the primary source; and means for actuating the auxiliary source upon failure of the primary source; the warning circuit comprising:
means, responsive to said actuating means, for generating a warning signal if said pressure sensor indicates said primary source is inoperable and the engine is actuated; and
means, responsive to said actuating means, for generating a warning signal if said pressure sensor is inoperable and the engine is actuated.

16. A warning circuit as defined in claim 15, further including:
means, responsive to said actuating means, for generating a warning signal if said auxiliary source actuation means is inoperable and the engine is actuated.

17. A warning circuit for a vehicle including an engine, a pressure actuated brake system, and means for actuating the engine; said brake system having a primary source of brake actuation pressure, an auxiliary source of brake actuation pressure, a pressure sensor for detecting a failure of the primary source; and means for actuating the auxiliary source upon failure of the primary source; the warning circuit comprising:
means, responsive to said actuating means, for generating a warning signal if said pressure sensor is inoperable and the engine is actuated.

18. A warning circuit as defined in claim 17, further including:
means, responsive to said actuating means, for generating a warning signal if said auxiliary source actuation means is inoperable and the engine is actuated.

19. A warning circuit for a vehicle including an engine, a pressure actuated brake system, and means for actuating the engine; said brake system having a primary source of brake actuation pressure, an auxiliary source of brake actuation pressure, a pressure sensor for detecting a failure of the primary source; and means for actuating the auxiliary source upon failure of the primary source; the warning circuit comprising:
means, responsive to said actuating means, for generating a warning signal if said auxiliary source actuation means is inoperable and the engine is actuated.

20. A warning circuit for a vehicle including an engine, a pressure actuated brake system, and means for actuating the engine; said brake system having a primary source of brake actuated pressure, an auxiliary source of brake actuation pressure, a pressure sensor for detecting a failure of the primary source; and means for actuating the auxiliary source upon failure of the primary source; the warning circuit comprising:
means, responsive to said actuating means, for generating a warning signal if said pressure sensor indicates said primary source is inoperable and the engine is actuated; and
means, responsive to said actuating means, for generating a warning signal if said auxiliary source actuation means is inoperable and the engine is actuated.

21. A warning circuit as defined in claims 15, 16, 17, 18, 19 or 20, further including:
means, responsive to said actuating means, for generating a warning signal if said auxiliary source is inoperable and the engine is actuated.

* * * * *